United States Patent [19]
Alexander et al.

[11] Patent Number: 5,463,847
[45] Date of Patent: Nov. 7, 1995

[54] ROBOTIC EGG CARTON PICKUP HEAD

[75] Inventors: Robert J. Alexander, Manchester; Daniel C. Stanglein, Hazelwood, both of Mo.

[73] Assignee: FPS Food Processing Systems, Inc., Lancaster, Pa.

[21] Appl. No.: 193,491

[22] Filed: Feb. 8, 1994

[51] Int. Cl.[6] .............................. B65B 23/02; B65B 5/04
[52] U.S. Cl. .................. 53/473; 53/258; 53/260; 294/119.1
[58] Field of Search ............................ 53/247, 260, 258, 53/255, 251, 248, 473, 475, 467; 294/103.1, 119.1

[56] References Cited

U.S. PATENT DOCUMENTS

| | | | |
|---|---|---|---|
| 2,624,611 | 1/1953 | Knapp | 294/103 |
| 3,021,167 | 2/1962 | Ostdiek | 294/119.1 |
| 3,193,319 | 7/1965 | Frock et al. | 294/107 |
| 4,192,121 | 3/1980 | Caudle | 53/260 X |
| 4,462,201 | 7/1984 | Nambu | 53/246 X |

FOREIGN PATENT DOCUMENTS 962105  10/1982  U.S.S.R. ................................ 53/260

Primary Examiner—James F. Coan
Attorney, Agent, or Firm—Notaro & Michalos

[57] ABSTRACT

The invention is an egg carton pickup head utilized in a robotic system for packing egg cartons into tight fitting containers. The automated pickup head includes a pair of wings which move linearly, toward or away from each other, three guide wheels affixed to each wing for guiding the movement of a pair of arcuate shaped carton engaging arms. The head further includes a first pair of actuating cylinders for moving the wings toward or away from each other and a second pair of actuating cylinders to actuate and retract the arms in an arcuate path similar to the radius and curvature of the arcuate pickup arms.

7 Claims, 2 Drawing Sheets

ROBOTIC EGG CARTON PICKUP HEAD

FIELD AND BACKGROUND OF THE INVENTION

This invention concerns an automated pickup head intended to be used in situations where articles are packed into tight-fitting containers, and the packing process involves repetitious movement.

Packing methods for fragile articles such as eggs, require delicate handling. Eggs are first placed in egg cartons, which provide individual storage sections for each egg. The common egg carton contains twelve eggs, and has a rectangular shape. The egg cartons are stacked in tight-fitting containers for shipment. The tight-fitting containers have a base with side walls spaced apart to closely accommodate the length of an egg carton. The tight-fitting container walls are necessary, so that any unnecessary movement of the egg cartons in the container is prevented during shipment.

The normal process of packing the egg cartons traditionally requires that a person carefully handle each carton individually during packing. A cardboard box or plastic container is typically placed near the end of a slow moving conveyor system or ramp, that delivers cartons of eggs to a position where they can be grasped by a person, and placed into the box or container. Cartons are stacked three or six to a layer, with multiple layers on top of each other until the container is full.

This packing process requires a great deal of slow repetitive movement that is not only monotonous for the person doing the work, but can also lead to carpel tunnel syndrome problems in the forearm and hand areas. An automated pickup head reduces the time requirement for packing, but must also be able to pack the cartons of eggs in their tight-fitting containers without having to drop them into position, causing egg breakage.

SUMMARY OF THE INVENTION

An automated pickup head provides a grasping mechanism that is capable of loading items into containers that are designed to restrict movement of the items within them due to the tight-fitting conditions. The pickup head uses arms that extend around the ends of an item having a lip, or protrusion, grasping the item against the head so that it can be placed into a tight-fitting container. The arms are withdrawn around the item in an arcuate path so as not to interfere with the walls of the packing container. This allows fragile items to be packed using an automated system, so that the item is not dropped in the container and the likelihood of damage is lowered.

The pickup head has a frame that supports two wing portions, with each wing supporting an arm assembly. Each wing, through the movement of an actuator moves horizontally in a linear path. The arm assembly is a rigid sheet or mesh that has been formed into an arc. The arm is supported between three guide wheels that direct the arcuate movement of the arm through an angular path. The path the arm follows has the same degree of curvature as the arm. When the arm is in its retracted position, the grasping end of the arm is at a 9:00 position to the center of rotation of the arm.

To pick up an item, the pickup head assembly is lowered over the target item, and the wings are spread apart until the arm's extended grasping ends are able to surround the item's length or width there between. The opposite end of an arm is connected to an actuator. Several guide wheels direct the arm along an arcual path, following the arm's arc of curvature. This causes the grasping end of the arm end to move downward and inward curving in toward the item. When the arm is fully extended, the arm's grasping end has moved inward toward the item, below the lip of protrusion.

Once the arms are lowered around the item, in their extended position, the wings are actuated, causing the arms to move inwards toward the item. When the arms contact the item, the pickup head is engaged for lifting the item.

The pickup head then moves into position over the target container, carrying the item. The container has an opening able to accommodate the head. The head lowers the item into the container, until the item is resting on the base of the container or other supports within the container.

Once the item is in its proper position, the arms are retracted along their arcuate path caused by the guide wheels and connecting actuator. The arms follow a path that mirrors the arm's arc, so that the arms are able to slip through the tight fitting gap between the item and the container walls. As the arms retract, they disengage and raise away from the item. The grasping ends of the arms, when retracted, actually move outward to release the item, due to the fact that the retracting path follows the arm's curvature. The arms, therefore, when retracted, do not exhibit any sideways movement.

The pickup head may be fixed to the bottom of a rotatable vertical shaft that has the ability to rotate the pickup head a fixed number of degrees. This allows the pickup head to properly position itself over the article to be moved, as well as to alternate the stacking pattern within the container.

DESCRIPTION OF THE PREFERRED EMBODIMENT

Figure 2:
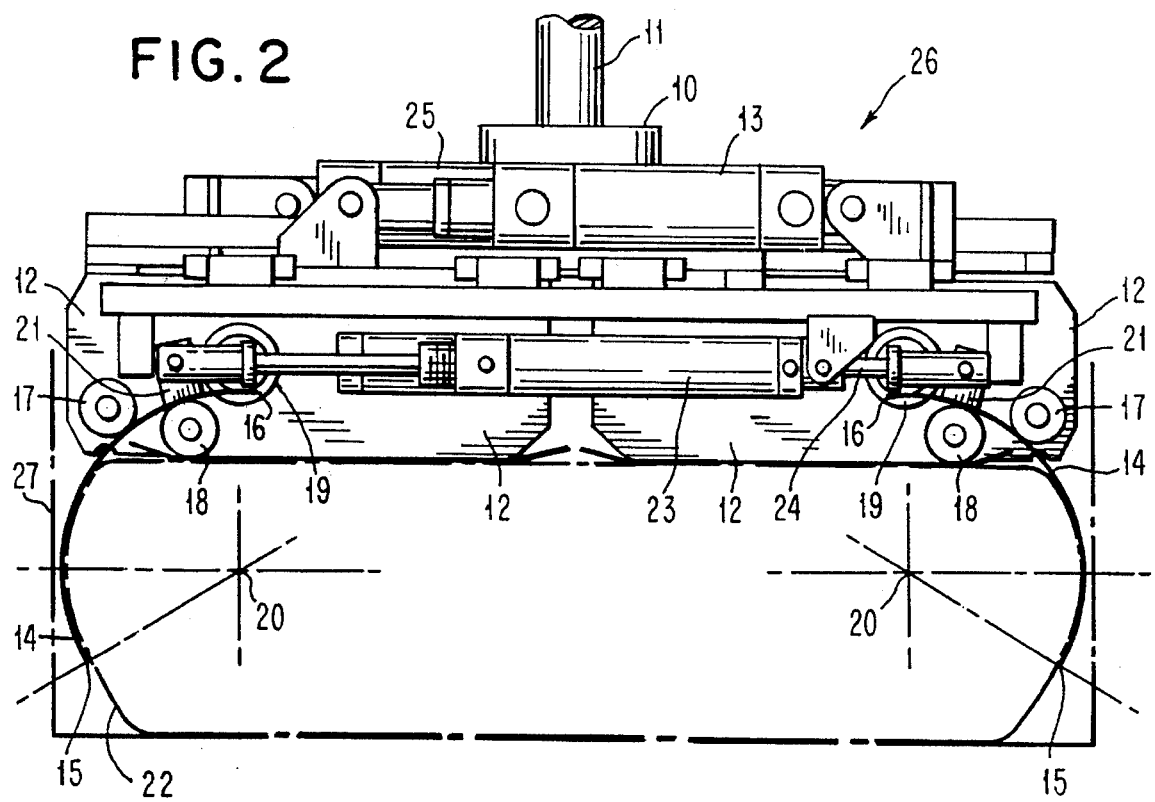
FIG. 2 is a symbolic side elevation view of the invention with the arms in the extended/engaged position.
Figure 3:
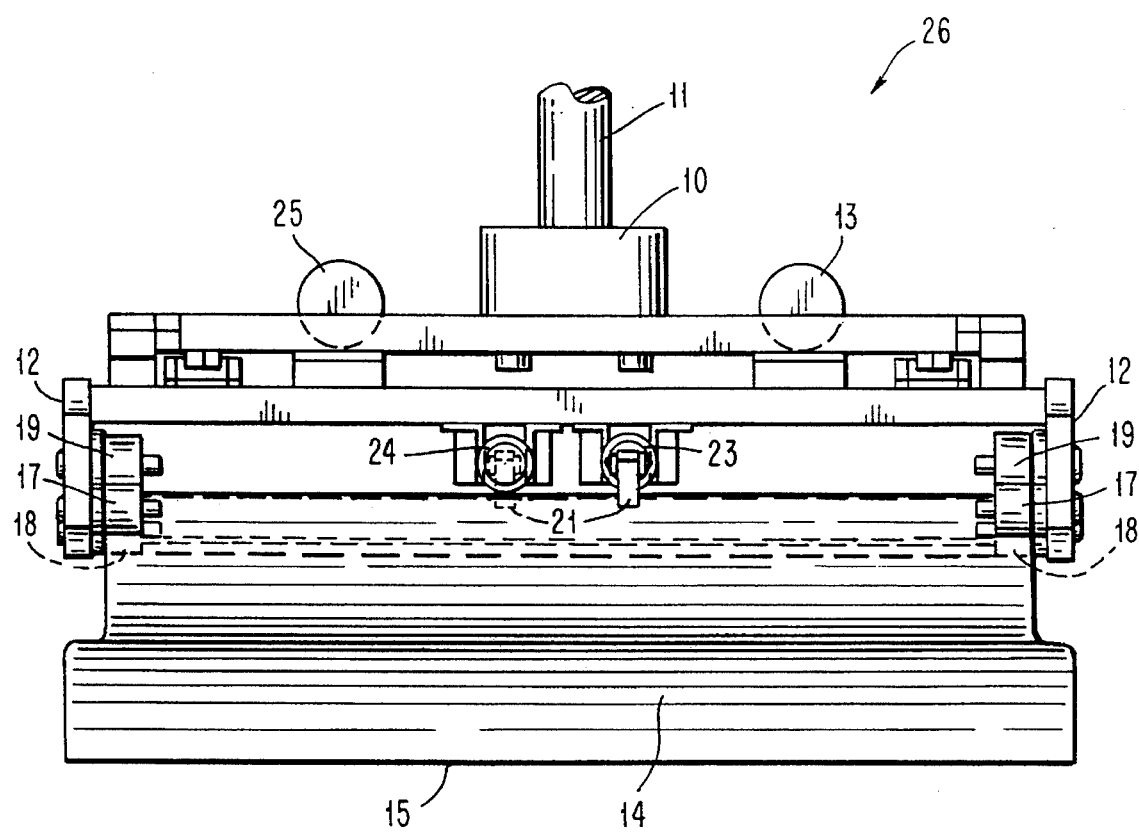
FIG. 3 is a symbolic end elevation with the arms in the extended position.

According to the present invention, an automated pickup head 26 is provided with retractable curved arms 14 capable of grasping the ends of an egg carton 22, as seen in FIG. 2, and packing them into tight-fitting containers 27. The pickup head 26 is able to lower the cartons 22 into the container for packing purposes, without having to drop them into position.

The pickup head has a rigid frame 10 that is fixed to a vertical shaft 11. The vertical shaft 11 is connected to actuators, not shown, which are capable of moving the head vertically, horizontally, and rotating the head 26 about shaft 11 so as to properly position the head above the item or position the item within the container 27. The frame 10 supports two wings 12 which are mounted opposably adjacent to each other, for linear movement towards or away from each other. The movement of the right wing 12 is actuated by a first double action hydraulic cylinder 13, which is pivotally fixed to the frame 10 on its left end, as viewed in FIG. 2, and pivotally fixed to the wing 12 on the other end. The left wing 12 is actuated in a similar manner by cylinder 25, partially seen in FIG. 2.

The curved arms 14 have a grasping end 15 and a top end 16. The curved arms 14 are preferably rigidly curved sheets of metal or plastic that have a sufficient extension of travel that allows the bottom grasping ends 15 to move closer together so as to grip the widest portion of an egg carton. Preferably, the arms 14 are relatively thin, thereby permitting their insertion into the available space between the packed egg carton ends and the inner wall of the container 27.

Each arm 14 is positioned between three guide wheels 17, 18 and 19, that are rigidly fixed to the right and left wings 12, and direct the path of movement of the arms 14, so that when actuated, they will travel in an arcuate path with the same radius of curvature and center of rotation 20 as the arm 14 itself. The top end 16 of the arm is fixed to a tab 21 that is pivotally connected to a piston rod of a double-acting hydraulic cylinder 23. The head end of the cylinder 23 is pivotally mounted to the left wing 12, and actuates left arm 14, as shown in the drawing. The arm 14 on the right wing is actuated by a similar cylinder 24 only of which the rod is visible in FIG. 2. The head end of cylinder 24 is attached to the right wing 12 and provides the actuation for right arm 14.

To grasp an egg carton, the pickup head 26 is rotated on shaft 11 with the wings and arms extended until the arms 14 are positioned surrounding corresponding ends of the egg cartons.

The pickup head 26 lowers until it is just touching the egg carton top surfaces, with the extended arms 14 surrounding the ends of the egg carton. The cylinders 23 are fully extended, as are the wing cylinders 13 and 25.

Figure 1:
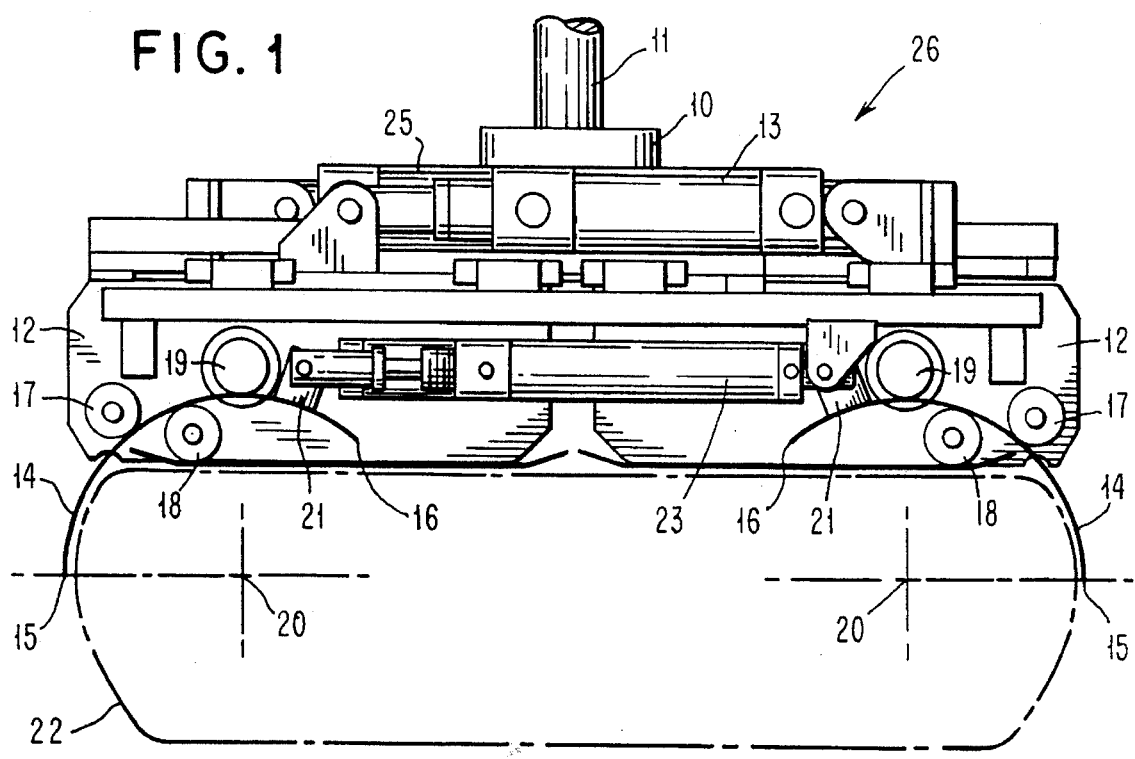
FIG. 1 is a symbolic side elevation view of the invention with the arms in the retracted/release position.

The cylinders 13 and 25 are now retracted, causing wings 12 to move inward, as shown in FIG. 2, with the arms 14 in contacting relation with the ends of egg carton 22. The pickup head 26 is now raised upwardly and moves the egg carton into position over a packing container 27. The head 26 lowers into the container to the desired level, and then retracts the cylinders 23 and 24 causing the arms 14 to move to their FIG. 1 position, releasing the carton 22. The grasping ends 15 of the arms retract along the path of the arm's curvature, from their 8:00 position of FIG. 2, to their 9:00 position of FIG. 1. The ends 15 actually move outward in a horizontal dimension, releasing the egg carton 22. The retraction of arms 14 along their arcuate path does not interfere with the closely spaced walls of the container 27.

Several egg cartons can be picked up at once, if the cartons are arranged side by side so that the arms 14 can grasp them along their ends. Preferably, the arms 14 will grasp three egg cartons, since some shipment containers allow just enough space for three egg cartons to be placed next to each other per layer. The egg cartons are then stacked on top of each other to a desired height, with the successive layers being stacked at 90 degrees to each other.

Although a preferred embodiment of the invention has been shown and described the invention is not intended to be limited thereto. Various modifications will be readily apparent to those of ordinary skill in this technology and the invention is to be limited only by the following claims.

We claim:

1. A method of packing an item in a close fitting container comprising:

providing a pickup head which comprises a rigid frame; at least two wings slidably mounted to the frame for movement toward and away from each other; at least two guide wheels fixed to each wing; an arcuate arm positioned between the guide wheels on each wing, each arm comprising only a curved rigid sheet which, when extended or retracted, moves in an arcuate path defined by said guide wheels, each arm having an inner arcuate surface for directly engaging an item to be picked up; first means to actuate the wings forward and away from each other; and second means to actuate the arms to move in the respective arcuate path;

operating the first means to move the wings away from each other;

operating the second means to move the arms downwardly along the arcuate paths;

operating the first means to move the wings toward each other to engage an item between the arms;

moving the pickup head to move the item into the close fitting container; and operating the second means to move the arms upwardly on the arcuate paths to release the item in the container.

2. A pickup head comprising: a rigid frame; at least two wings slidably mounted to the frame for movement toward and away from each other; at least two guide wheels fixed to each wing; an arcuate arm positioned between the guide wheels on each wing, each arm comprising only a curved rigid sheet which, when extended or retracted, moves in an arcuate path defined by said guide wheels, each arm having an inner arcuate surface for directly engaging an item to be picked up; first means to actuate the wings forward and away from each other; and second means to actuate the arms to move in the respective arcuate path.

3. A pickup head, as described in claim 2, in which the first means to actuate the wings comprises a double acting hydraulic cylinder, with one end connected to a wing and the opposite end connected to the frame.

4. A pickup head, as described in claim 2, further including a means to rotate the frame comprises a vertical rotating shaft fixed to the frame.

5. A pickup head, as described in claim 2, in which the second means to actuate the arms comprises a double action hydraulic cylinder, with one end pivotally connected to a wing and the opposite end pivotally connected to an arm, which when extended or retracted, move in an arcuate path defined by said guide wheels.

6. A pickup head, as described in claim 2, in which three guide wheels are used.

7. A pickup head, as described in claim 2, wherein each arm comprising only a curved rigid sheet, has a center of curvature, a first end connected to the second means and an opposite end spaced from the second means, the guide wheels being positioned so that the accurate path of movement of each arm has a center of curvature corresponding to the center of curvature of each arm, respectively.

\* \* \* \* \*